United States Patent
Persson

(10) Patent No.: US 7,451,807 B2
(45) Date of Patent: Nov. 18, 2008

(54) HEAT EXCHANGER AND METHOD FOR DRYING A HUMID MEDIUM

(75) Inventor: Lars Persson, Abbekas (SE)

(73) Assignees: Advanced Flow Technology Inc., Chiba (JP); EP Technology AB, Malmo (SE)

( * ) Notice: Subject to any disclaimer, the term of this patent is extended or adjusted under 35 U.S.C. 154(b) by 617 days.

(21) Appl. No.: 10/544,024

(22) PCT Filed: Jan. 29, 2004

(86) PCT No.: PCT/SE2004/000113

§ 371 (c)(1),
(2), (4) Date: Jul. 29, 2005

(87) PCT Pub. No.: WO2004/070302

PCT Pub. Date: Aug. 19, 2004

(65) Prior Publication Data

US 2006/0191674 A1    Aug. 31, 2006

(30) Foreign Application Priority Data

Feb. 3, 2003    (SE) ................................ 0300259

(51) Int. Cl.
*F28D 9/00* (2006.01)
*B21D 53/26* (2006.01)

(52) U.S. Cl. .................... 165/167; 165/114
(58) Field of Classification Search ............ 165/166, 165/167

See application file for complete search history.

(56) References Cited

U.S. PATENT DOCUMENTS

| | | | | | |
|---|---|---|---|---|---|
| 4,249,595 | A | * | 2/1981 | Butt ........................... | 165/110 |
| 5,016,707 | A | * | 5/1991 | Nguyen ...................... | 165/167 |
| 5,245,843 | A | * | 9/1993 | Shimoya et al. ............... | 62/515 |
| 5,678,422 | A | * | 10/1997 | Yoshii et al. .................. | 62/513 |
| 5,682,945 | A | * | 11/1997 | Lehman ...................... | 165/111 |
| 5,727,623 | A | * | 3/1998 | Yoshioka et al. ............. | 165/113 |
| 5,787,975 | A | * | 8/1998 | Grenier et al. .............. | 165/166 |
| 5,857,517 | A | * | 1/1999 | Grenier et al. .............. | 165/166 |
| 5,904,205 | A | * | 5/1999 | Grenier et al. .............. | 165/166 |
| 6,536,511 | B1 | * | 3/2003 | Nilsson et al. .............. | 165/113 |
| 6,564,862 | B1 | * | 5/2003 | Persson ...................... | 165/140 |
| 2004/0011514 | A1 | * | 1/2004 | Holm et al. ................. | 165/166 |

FOREIGN PATENT DOCUMENTS

WO        84/01022        3/1984

* cited by examiner

*Primary Examiner*—Allen J Flanigan
(74) *Attorney, Agent, or Firm*—Oblon, Spivak, McClelland, Maier & Neustadt, P.C.

(57) ABSTRACT

A heat exchanger and a method for drying a humid medium. In the heat exchanger an internal cross-over passage, allowing a humid medium to double back on itself in a zone delimited by a barrier, is provided. In a first step the heat exchanger cools itself and in a final step the heat exchanger heats itself. Separation areas allow condensation and collection of water within the heat exchanger. The heat exchanger and method enable drying of compressed air within one and the same heat exchanger package.

13 Claims, 2 Drawing Sheets

HEAT EXCHANGER AND METHOD FOR DRYING A HUMID MEDIUM

FIELD OF INVENTION

The present invention relates to a heat exchanger and a method for generally removing solvents from gases, e.g. drying a humid medium. The invention is especially useful as a heat exchanger and method for drying compressor air. Due to a novel design the invention enables drying of compressed air within one and the same brazed heat exchanger package.

STATE OF THE ART

Drying of compressor air requires the steps of cooling the air allowing the water to condense, collection of the water, and finally heating of the air for supplying to various compressed air controlled devices. In the prior art, the cooling and heating steps were performed in separate heat exchangers with a condenser, e.g. a cyclone, located therebetween. This resulted in a very expensive and bulky apparatus. It was not realised how all these steps could be performed within the same heat exchanger package. Thus, there exists a need for an improved heat exchanger.

SUMMARY OF THE INVENTION

The present invention solves the above problems by providing a heat exchanger in which there is arranged an internal cross-over passage, allowing the humid medium to double back on itself, in a first step cooling itself and in a final step heating itself, thus resulting in a high efficiency. The invention also features separation areas allowing condensation and discharge of water within the brazed heat exchanger.

In a first aspect, the invention provides a heat exchanger comprising plates, with a pattern of grooves and with inlet and outlet connections, placed in a package and brazed together to form separate ducts for two media, a first set of ducts being provided for allowing a first medium to flow between first pairs of plates, and a second set of ducts being provided for allowing a second medium to flow between alternate pairs of plates.

According to the invention, at least one delimited zone is defined by a barrier within said package, said barrier blocking off areas inside said second set of ducts for said second medium, while not blocking off areas inside said first set of ducts for said first medium. Said zone has an inlet, in the form of a cross-over passage arranged between the first pairs of ducts and the second set of ducts, and an outlet for circulation of the first medium through said areas within said delimited zone under heat exchange with said first medium.

In one embodiment, at least one further outlet is arranged in the first set of ducts and connected to an exterior valve arranged only to allow passage of liquid.

Preferably, in the first set of ducts, separation areas are arranged in the form of spaces capable of slowing down the flow rate of the first medium.

In a second aspect, the invention provides a method for drying a humid medium, in which said humid medium is circulated as the first medium and a coolant is circulated as the second medium in such a heat exchanger.

The humid medium may be compressed air containing water and the coolant may be a fluorinated hydrocarbon, such as Freon™.

BRIEF DESCRIPTION OF THE DRAWINGS

The invention will be described below in detail with reference to the accompanying drawings, in which.

DETAILED DESCRIPTION OF PREFERRED EMBODIMENTS

Plate type heat exchangers are generally known devices for heat exchange between two different media. Plate type heat exchangers are used in a multitude of contexts and the present invention is not limited to the special application described herein after, but is especially useful for drying compressed air. The invention is also most easily applied to heat exchangers of the wholly brazed type. This means that the heat exchanger generally consists of plates having a groove pattern and inlet and outlet connections for two media. The plates are placed in a package and are brazed together into a fixed unit. Separate ducts are thus formed for the two media, circulating in opposite directions between alternate pairs of plates. This technique is commonly known and will not be described in detail here.

The invention enables drying of compressed air, which may have a relative humidity of up to a hundred percent at 8 bar and 45° C. The air is first to be cooled such that condensation and collection of water can take place and then to be heated again to a suitable temperature, e.g. 37° C., such that no condensation takes place on conduits and machinery to which the dried air is supplied. As will be explained in detail below, the incoming humid air is first cooled by heat exchange with the outgoing dried air in one part of the heat exchanger. In a second part of the heat exchanger, the air is further cooled by heat exchange with a coolant. Condensation and collection of water take place in this second part. Finally, the dried air is heated by heat exchange against the incoming air, again in the first part.

Figure 1:
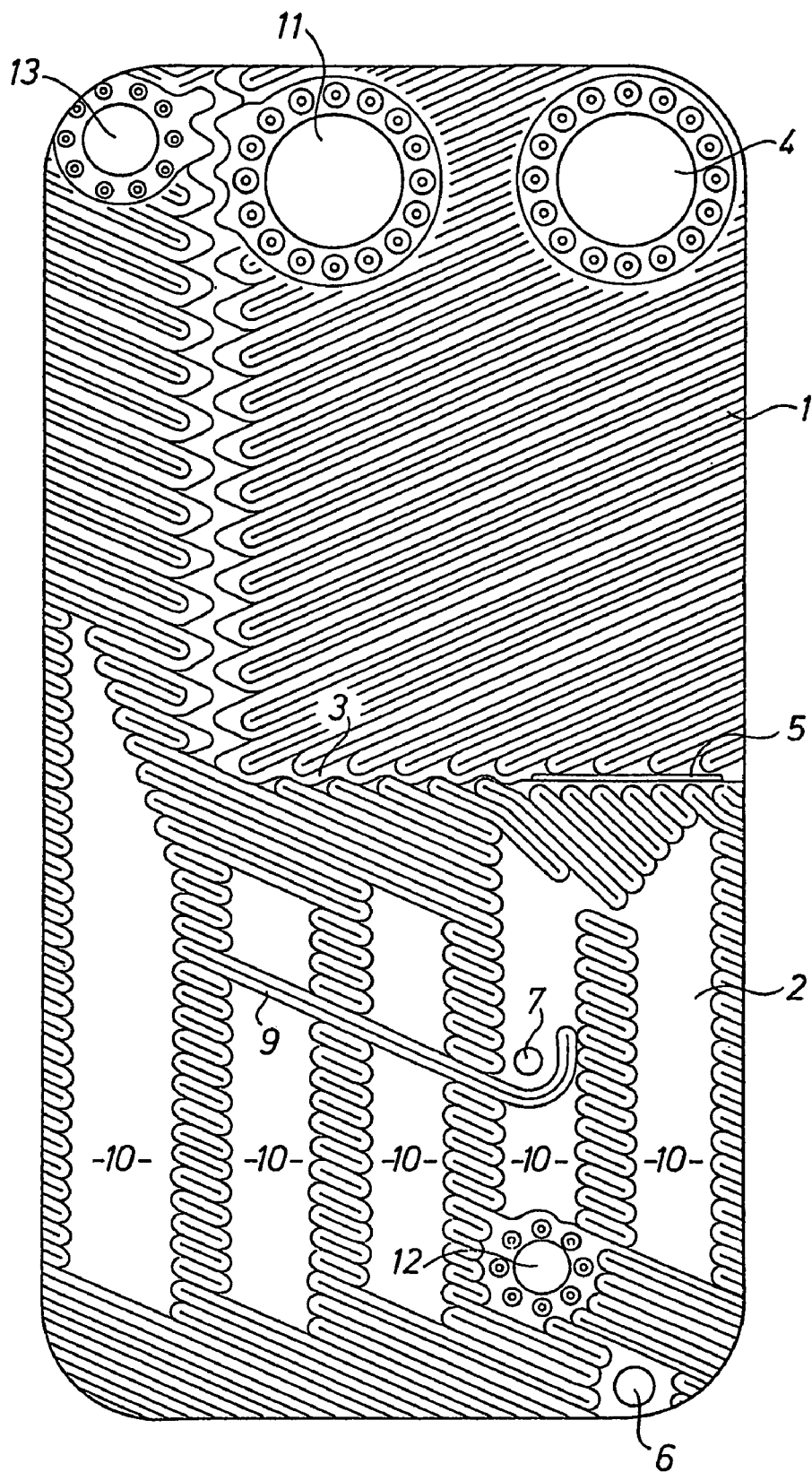
FIG. 1 is a view of a typical heat exchanger plate in accordance with the invention.

FIG. 1 generally shows a typical rectangular heat exchanger plate having a pattern of grooves and ridges as is conventional. Every second plate is arranged with these grooves and ridges in a criss-cross manner as is conventional. A first set of ducts is formed between first pairs of plates and a second set of ducts is formed between alternate second pairs of plates as is conventional. However, in contrast to a conventional heat exchanger, a barrier 3 is provided separating a first part 1 of the heat exchanger from a second part 2. This delimited zone 1 is suitably located in a corner of the plate and extends approximately to the middle of the plate. The barrier 3 only affects the flow in the second set of ducts. It is formed by a continuous brazing between contacting grooves and recesses in alternate plates. A more detailed discussion of this kind of barrier is shown in the European patent 1097346 issued to EP Technology AB.

The first set of ducts has an inlet 4 for a first medium A, i.e. air. However, the first set of ducts has no ordinary air outlet to the exterior. Instead, there is arranged a cross-over passage 5 letting the medium A pass from the first set of ducts into the second set of ducts. The cross-over passage 5 may generally be formed by making a slit in the plate. The slit is located inside the barrier 3, i.e. in the first part 1 of the heat exchanger. The cross-over passage 5 is suitably arranged close to the edge.

The first set of ducts is also provided with other outlets. There is at least one outlet 6 for condensed water. This is connected to a valve 8, which is devised only to let through water and not air. Preferably, there is also a second outlet 7 for condensed water. This is arranged in the hook portion of a hook-shaped collection ridge 9. The outlet 7 may be connected to the same valve 8 or a separate valve (not shown). The collection ridge 9 is formed in the same manner as the barrier 3 but only affects the first set of ducts.

In the first set of ducts there are also arranged a number of separation areas 10, in which no grooves or ridges are formed. The function of these areas is to slow down the flow rate of the passing medium, e.g. to 4 m/s, and obtain a laminar flow without turbulence. This assists in condensing the water.

The second set of ducts has the following connections. There is an outlet 11 for the for the first medium A, i.e. the air, entering through the cross-over passage 5. The outlet (11) of the delimited zone is suitably located diagonally opposite the cross-over passage (5). A second medium B, i.e. the coolant, enters at inlet 12 and exits through outlet 13.

The function of the heat exchanger will be described with reference to the flow diagrams shown in to FIGS. 2 and 3. During the drying process the air inlet and air outlet should be oriented upwards, while the outlets 6 and 7 for water should be oriented downwards.

Figure 2:
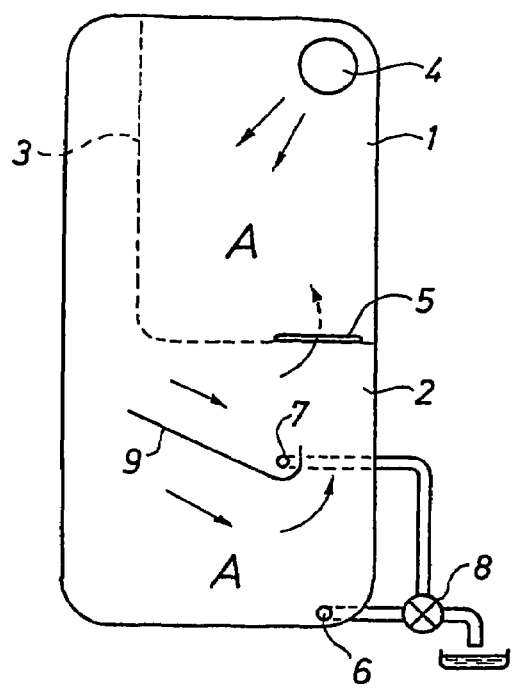
FIG. 2 is a schematic view of flows in a first set of ducts.

FIG. 2 shows the flows in the first set of ducts. Since there is no barrier here he same medium A flows throughout the whole heat exchanger albeit with heat exchange relationships with different media A and B in the second set of ducts. The barrier 3 is shown with a broken line. The humid air enters through inlet 4 in the first part 1 of the heat exchanger. (The humid air is pre-cooled from 130-140° C.) By heat exchange against the outgoing air the incoming air is cooled e.g. from 45° C. to 23° C. The air passes into the second part 2 of the heat exchanger, in which the air is further cooled to e.g. 10° C. Also, water is condensed and collected through the outlets 6 and 7.

The efficiency of the condensation is enhanced by the separation areas 10, shown in FIG. 1. However, the separation areas 10 are not necessary if the flow rate is sufficiently slow. To achieve a sufficiently slow flow rate also the height of the grooves may be increased. However, a groove height of e.g. approximately 3 mm resulting in separation areas with a height of approximately 6 mm are preferred, since the heat exchanger will have a stronger construction and be more compact, and the manufacturing process, including the bending and the brazing of the plates, is simplified.

Also, the collection ridge and the outlet 7 are not necessary, but preferred. The collection ridge 9 helps to divert the air downwards and prevent the air from exerting lifting forces on the condensed water.

In the second part of the heat exchanger the air turns upwards and is directed out through the cross-over passage 5 into the other side, i.e. into the second set of ducts.

Figure 3:
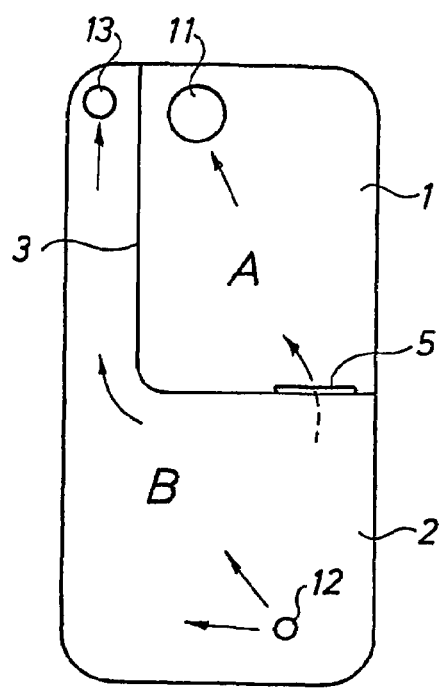
FIG. 3 is a schematic view of flows in a second set of ducts.

The flows in the second set of ducts are shown in FIG. 3. In the first part 1 of the heat exchanger air A enters through the cross-over passage 5 and exits through the outlet 11. During this passage the outgoing air is heated by the incoming air, e.g. from 10° C. to 37° C.

In the second part of the heat exchanger the coolant, such as a fluorinated hydrocarbon, e.g. Freon™, enters through inlet 12 and exits through outlet 13. Because of the barrier 3 the coolant in the second part is always separated from the air in the first part, even though these two media flow between the same pairs of plates, in this application called the second set of ducts.

A person skilled in the art will appreciate that the invention has solved the problem of drying humid air within one and the same heat exchanger also performing the required cooling and heating steps. Because of the delimited zone formed by the barrier and the cross-over passage, a very efficient process is obtained. The heat exchanger is also applicable in other processes, such as generally removing solvents from gases. In this context the term drying is equivalent with condensing any vapour or gas solved in another gas. The scope of the invention is only limited by the claims below.

The invention claimed is:

1. A heat exchanger comprising:
   plates, with a pattern of grooves and with inlet and outlet connections, placed in a package and brazed together to form separate ducts for two media, a first set of ducts being provided for allowing a first medium to flow between a first pair of the plates, and a second set of ducts being provided for allowing a second medium to flow between alternate pairs of the plates; and
   at least one delimited zone defined by a barrier within the package, the barrier blocking off areas inside the second set of ducts for the second medium, while not blocking off areas inside the first set of ducts for the first medium, the delimited zone having an inlet, in a form of a cross-over passage arranged between the first set of ducts and the second set of ducts, and an outlet for circulation of the first medium through the areas within the delimited zone under heat exchange with the first medium.

2. A heat exchanger according to claim 1, further comprising at least one further outlet arranged in the first set of ducts and connected to an exterior valve arranged only to allow passage of liquid.

3. A heat exchanger according to claim 1, wherein the inlet comprises a slit arranged in the respective plates.

4. A heat exchanger according to claim 1, wherein the plates are substantially rectangular and the delimited zone is located in a corner of the plates.

5. A heat exchanger according to claim 4, wherein the inlet is arranged near a middle of the plates, close to an edge, and the outlet of the delimited zone is located diagonally opposite the cross-over passage.

6. A heat exchanger according to claim 1, wherein, in the first set of ducts, separation areas are arranged in a form of spaces configured to slow down a flow rate of the first medium.

7. A heat exchanger according to claim 1, wherein the separation areas are arranged in a form of flat areas without grooves.

8. A heat exchanger according to claim 6, wherein a number of separation areas is arranged in the plates outside the delimited zone.

9. A heat exchanger according to claim 2, further comprising a collection ridge located in the plates outside the delimited zone and configured to conduct condensed liquid to a second further outlet arranged in the first set of ducts and connected to an exterior valve arranged only to allow passage of liquid.

10. A heat exchanger according to claim 1, wherein the collection ridge is hook-shaped and the second further outlet is arranged in the hook portion.

11. A method for drying a humid medium, comprising:
    circulating in a heat exchanger according to claim 2, the humid medium as the first medium and a coolant as the second medium.

12. A method according to claim 11, wherein the humid medium is compressed air containing water.

13. A method according to claim 11, wherein the coolant is a fluorinated hydrocarbon.

* * * * *

UNITED STATES PATENT AND TRADEMARK OFFICE
CERTIFICATE OF CORRECTION

PATENT NO. : 7,451,807 B2  Page 1 of 1
APPLICATION NO. : 10/544024
DATED : November 18, 2008
INVENTOR(S) : Persson It is certified that error appears in the above-identified patent and that said Letters Patent is hereby corrected as shown below:

On the Title Pg

Item [*] Notice: Subject to any disclaimer, the term of this patent is extended or adjusted under 35 USC 154(b) by 617 days Delete the phrase "by 617 days" and insert -- by 729 days --

Signed and Sealed this

First Day of June, 2010

David J. Kappos
*Director of the United States Patent and Trademark Office*